(12) United States Patent
Grévain et al.

(10) Patent No.: US 10,974,992 B2
(45) Date of Patent: Apr. 13, 2021

(54) LOW NOX CALCINER

(71) Applicant: FLSmidth A/S, Valby (DK)

(72) Inventors: Damien Grévain, Brøndby Strand (DK); Mads Nielsen, Gadstrup (DK)

(73) Assignee: FLSmidth A/S

( * ) Notice: Subject to any disclaimer, the term of this patent is extended or adjusted under 35 U.S.C. 154(b) by 0 days.

(21) Appl. No.: 16/643,190

(22) PCT Filed: Aug. 29, 2018

(86) PCT No.: PCT/EP2018/073192
§ 371 (c)(1),
(2) Date: Feb. 28, 2020

(87) PCT Pub. No.: WO2019/043036
PCT Pub. Date: Mar. 7, 2019

(65) Prior Publication Data
US 2020/0207661 A1 Jul. 2, 2020

(30) Foreign Application Priority Data
Aug. 30, 2017 (DK) .......................... PA 2017 70653

(51) Int. Cl.
*C04B 7/36* (2006.01)
*B01D 53/56* (2006.01)
*B01D 53/79* (2006.01)
*C04B 7/44* (2006.01)
*F27B 1/00* (2006.01)

(52) U.S. Cl.
CPC .............. *C04B 7/364* (2013.01); *B01D 53/56* (2013.01); *B01D 53/79* (2013.01); *C04B 7/4469* (2013.01); *F27B 1/005* (2013.01)

(58) Field of Classification Search
None
See application file for complete search history.

(56) References Cited

U.S. PATENT DOCUMENTS 5,919,301 A   7/1999   Rother

FOREIGN PATENT DOCUMENTS

JP   S58202033 A   11/1983

OTHER PUBLICATIONS

The International Search Report and Written Opinion dated Nov. 16, 2018, 12 pages.

*Primary Examiner* — Jelitza M Perez
(74) *Attorney, Agent, or Firm* — Jeffrey A Sharp

(57) ABSTRACT

A system for reducing NOx emission levels during the manufacture of cement clinker having a calciner unit with the following features: an upper portion; a lower portion; a NOx reduction zone in the lower portion; a tertiary air inlet in the upper portion for introducing tertiary air into the upper portion; a main calciner meal inlet located above the NOx reduction zone for introducing a main calciner meal portion into the upper portion; a first cooling calciner meal inlet located in the NOx reduction zone for introducing a first cooling calciner meal portion into a periphery of the NOx reduction zone; and a fuel inlet located in or below the NOx reduction zone for introducing fuel into the reduction zone.

6 Claims, 3 Drawing Sheets

LOW NOX CALCINER

FIELD OF THE INVENTION

The present invention relates to a system for reducing nitrogen oxide emission levels during the manufacture of cement clinker, and more particularly to a calciner unit for use in such a system.

BACKGROUND OF THE INVENTION

At a cement system, in the cement clinker manufacturing process, cement raw meal is preheated in a preheater, calcined in a calciner comprising an upper end and a lower end, burned into clinker in a kiln and cooled in a subsequent clinker cooler. In some existing cement systems, the calciner is specifically designed for using fuels having a low content of volatile constituents, such as petrocoke, whereas in other existing systems the calciner is specifically designed for attaining low NOx emission levels. There is strong evidence that more stringent requirements will be imposed in terms of acceptable NOx emission levels and that the utilization of fuels with a low content of volatile constituents will continue to be advantageous. Accordingly, there is a need for a system for manufacturing cement clinker, which will embody both of these beneficial effects at one and the same time.

A range of technologies is available for limiting NOx emission levels and for burning fuels with a low content of volatile constituents in cement systems. For example, it is possible to limit NOx emission levels by primary methods, such as the appropriate design of burner equipment, appropriate design of calciner and preheater, or by secondary methods involving injection of extraneous substances such as ammonia and urea at designated locations in the preheater.

For example, a kiln system of the type ILC low-NOx is known from Japanese patent application No. 155433-1978. This system comprises a combustion chamber which is located between the kiln and the calciner and which in practice constitutes the lower part of the calciner. Limitation of NOx emission is achieved by injecting fuel into the combustion chamber, which constitutes a so-called reducing zone, involving a combustion of fuel by reacting with NOx contained in the exhaust gases from the kiln, thereby reducing the NOx content. According to more recently known methods a small amount of preheated raw meal from the preheater may be introduced into this zone in order to limit the temperature. Preheated air from the clinker cooler as well as preheated raw meal from the preheater are subsequently fed to the calciner. In this known kiln system, exhaust gases from the kiln are introduced at the bottom of the combustion chamber, thereby causing the gases to flow upwards through the combustion chamber and the subsequent calciner. In this type of calciner the raw meal must thus be directed up through the main part of the calciner suspended in the gas stream which flows upwards through the calciner. As for this type of calciner, it is a distinct disadvantage that a low NOx emission cannot be attained when burning fuels with a low content of volatile constituents in the calciner because of the excessive cooling of the gas/fuel suspension.

For example, kiln systems of the type SLC-D are known from U.S. Pat. No. 4,014,641 and PCT/DK97/00029. This type of system incorporates a calciner which comprises a chamber configured as a downward-directed gas duct which at its lower end is connected to an upward-directed gas duct which is further connected to the exhaust gas discharge end of the kiln. Calcination essentially takes place in the downward-directed gas duct. The majority of the fuel used in the calciner is introduced axially at the top of the calciner. Preheated air from the clinker cooler and preheated raw meal are directed tangentially into the top of the calciner. Complete combustion of a substantial amount of the calciner fuel is thus attained in the calciner while the raw meal is simultaneously calcined during its passage down through the chamber. The suspension of exhaust gases, unburned fuel and at least partially calcined raw meal from the calciner are joined together in the upward-directed gas duct with an upward flow of kiln exhaust gases, to which should possibly be added a small amount of the calciner fuel and a small amount of preheated raw meal. The combined or intermingled exhaust gas/material suspension subsequently flows up through the upward-directed gas dust where any residual amount of raw meal and preheated air which have not yet been supplied from the clinker cooler can be added. The advantage of this known type of system is that fuels with a low content of volatile constituents can be used due to the special embodiment of the calciner, which will make it possible to attain a high degree of combustion efficiency even when using such fuels.

Further, the production of NOx in the calciner is quite low. However, the disadvantage of this type of kiln system is that it may become necessary to add a proportion of uncalcined raw meal directly into the exhaust gases from the kiln in order to fight coatings in the kiln smoke chamber and/or in the kiln riser duct. As a result, the exhaust gas/fuel suspension is cooled excessively which entails limited possibilities of reducing the NOx which is produced in the kiln, when using fuel with a low content of volatile constituents.

OBJECT OF THE INVENTION

It is an object of the invention to overcome or at least alleviate one or more of the above problems and/or provide the consumer with a useful or commercial choice.

It is an object of the invention to provide a system for manufacturing cement clinker by means of which it will be possible to attain a high degree of combustion efficiency even when using fuel with a low content of volatile constituents and to attain a low level of NOx emission.

BRIEF DESCRIPTION OF THE FIGURES

Embodiments of the invention by way of example only will be described with reference to the accompanying drawings in which.

DETAILED DESCRIPTION OF THE INVENTION

Figure 1:
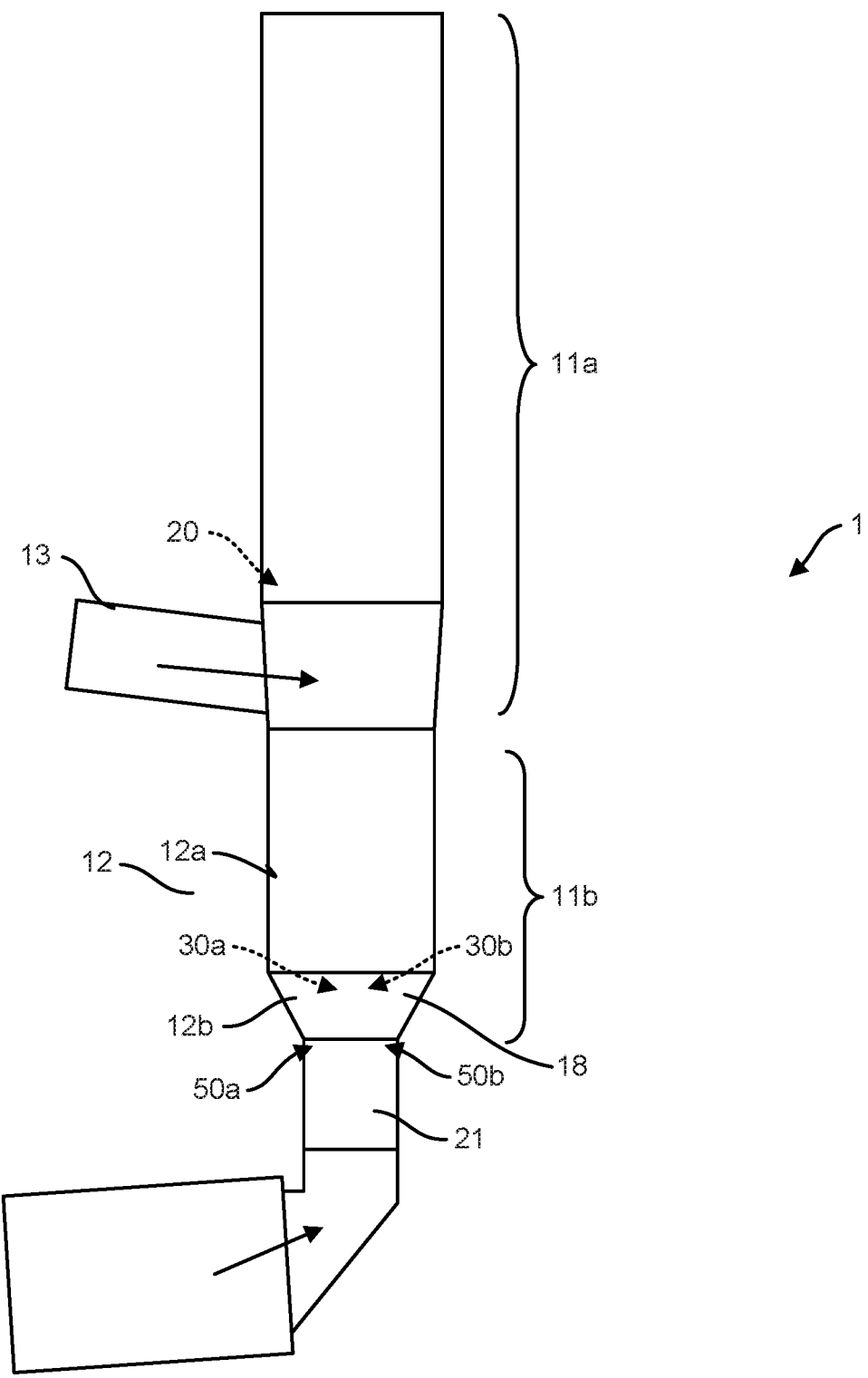
FIG. 1 shows a side view of a first exemplary embodiment of the system comprising a calciner.

As shown in FIG. 1, the calciner of the present invention has an upper portion 11a and a lower portion 11b. A NOx reduction zone 12 is located in the lower portion 11b and a tertiary air inlet 13 is located in the upper portion 11a. Typically, the NOx reduction zone 12 has a refractory layer 12a on the inside surface thereof. The tertiary air inlet 13 is designed to introduce tertiary air into the upper portion 11a.

There is also a main calciner meal inlet 20 located above the NOx reduction zone 12 for introducing a main calciner meal portion into the upper portion 11a.

Figure 2:
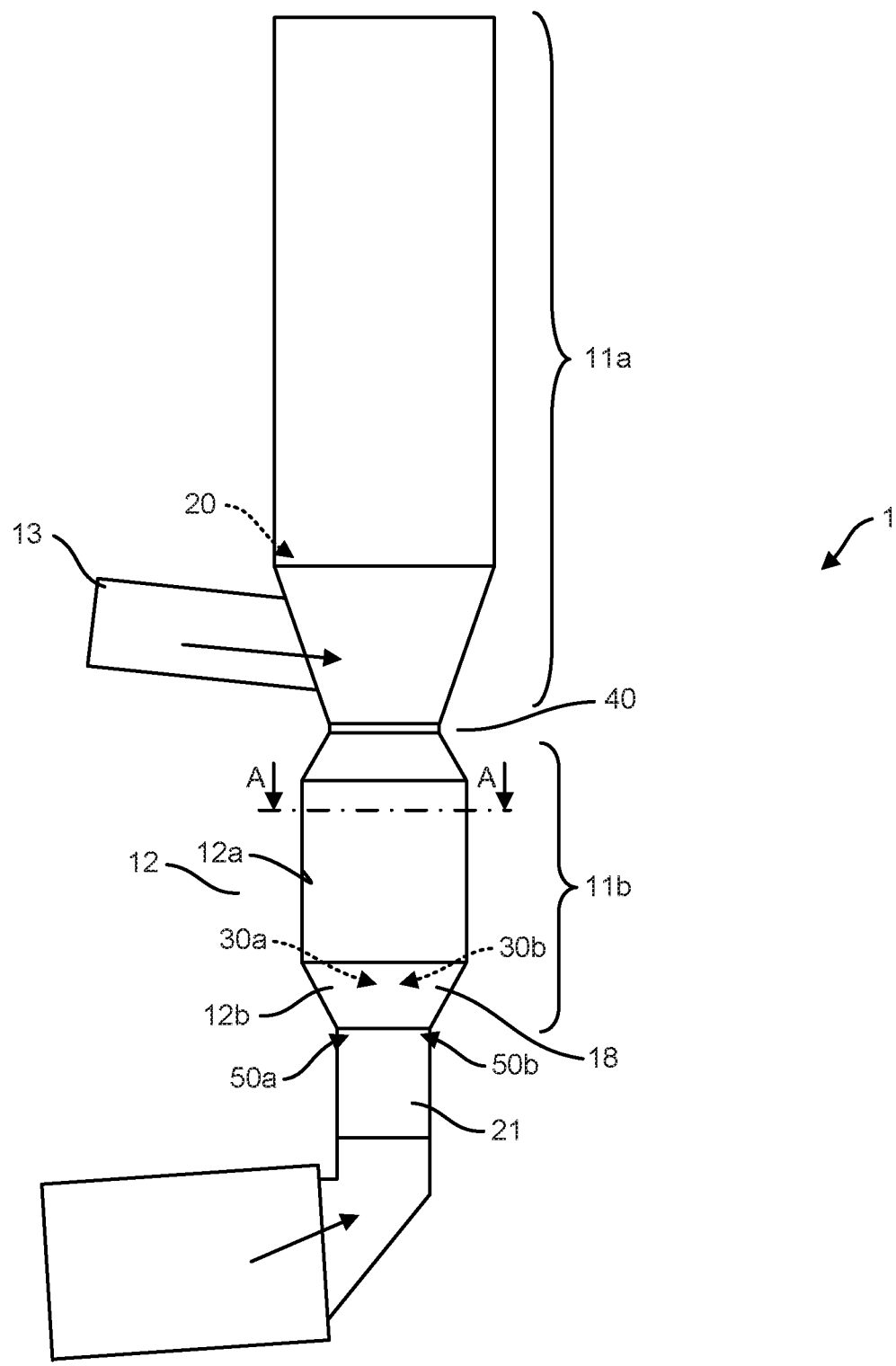
FIG. 2 shows a side view of a second exemplary embodiment of the system comprising a calciner.

Kiln gas can be introduced into the calciner 11 via the riser unit 21. One or more fuel inlets 50a, 50b can be provided for providing a fuel rich hot core in the kiln gas can be provided in or below a NOx reduction zone 12, e.g. in the riser unit 21. The kiln exhaust gas/fuel suspension is directed up into the NOx reduction zone 12. Raw-meal can be introduced tangentially in the NOx reduction zone 12 via a cooling calciner meal inlet 30a, 30b to encapsulate the fuel rich hot core with a peripheral cooling layer. The design of the NOx reduction zone 12 enables a hot core of kiln gas mixed with fuel to react with kiln NOx and raw-meal to encapsulate the hot core to protect the walls of the downstream reactor. Tertiary air can be introduced via a tertiary air inlet 13 into the upper portion of the calciner. Raw meal can also be introduced through the main calciner meal inlet 20. The cross section of the calciner 11 is sufficiently reduced via a constriction (40) (e.g. as shown in FIG. 2) to keep introduced calciner meal suspended and to avoid e.g. (a) undesirable cooling of the primary NOx reduction zone meal introduced via the main calciner meal inlet 20 and (b) intrusion of tertiary air in the NOx reduction zone 12.

Figure 3:
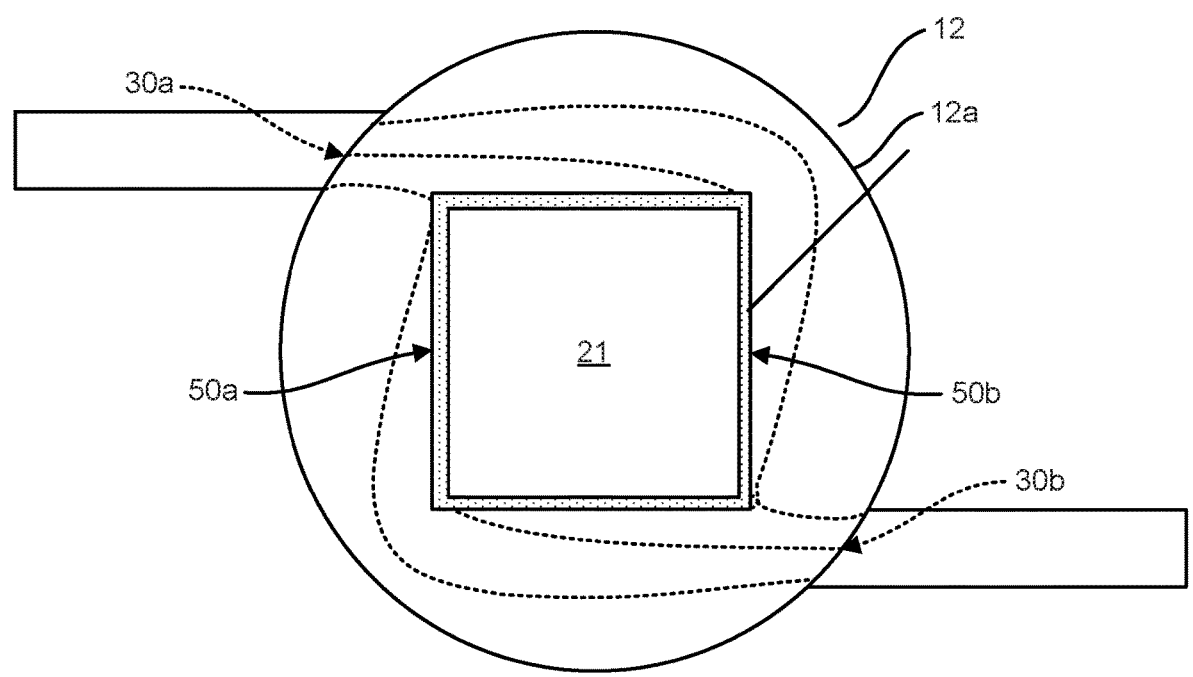
FIG. 3 shows a cross sectional view of the NOx reduction zone of the calciner.

As shown in FIG. 3, there can be one fuel inlet 50a (or more 50b) in the riser 21 to provide NOx reducing conditions to the kiln gas. The riser is represented by the square section in the centre of FIG. 3. On top of the riser is an expansion of the gas flow cross-section to the downstream primary NOx reduction zone 12 represented by the larger circular cross-section. In the reduction zone 12 there can be one meal inlet 30a (or more 30b). The raw meal is introduced tangentially above (downstream) the fuel inlet 50, 50b to encapsulate the fuel rich hot core with a peripheral cooling layer. The raw meal trajectories are shown in FIG. 3. The tangential raw-meal trajectories allow the cooling raw-meal to cover e.g. the entire periphery of the transition between the riser and the expansion to the reduction zone 21. The kiln gas flow at the periphery entrains the raw-meal towards the calciner 11. The cooling raw-meal is thus able to encapsulate to hotter kiln gas core supplied with fuel to provide NOx reducing conditions. The encapsulation protects the walls of the reduction zone against high-temperature detriments. The tangential approach of the raw-meal to the kiln gas in the riser avoids the excessive intrusion of cooling raw-meal in the hot and reducing core provided to the kiln gas by fuel inlet.

It is the objective of the present invention to provide a method as well as a system for manufacturing cement by means of which it will be possible to attain a high degree of combustion efficiency even when using fuel with a low content of volatile constituents and to attain a low level of NOx emission.

This is obtained by a system in which exhaust gases from the kiln are introduced into the upper end of the calciner, in that fuel is likewise introduced into the upper end of the calciner, in that the exhaust gas/fuel suspension is directed down through the calciner, in that preheated air from the clinker cooler and preheated raw meal from the preheater in combination or separately are fed into the calciner at a location under the zone where exhaust gases from the kiln and fuel are introduced, in that the preheated air is directed down through the calciner, being gradually mixed with the exhaust gas/fuel suspension, in that the raw meal under the action of gravity is directed down through the calciner along its wall, being suspended in the exhaust gases at the lower end of the calciner, and in that the exhaust gas/raw meal suspension is extracted from the lower end of the calciner and conveyed to a separating means for separating the raw meal which is subsequently directed to the kiln.

Hereby is obtained a significant reduction of the NOx which is led to the calciner together with the kiln exhaust gases, a high degree of fuel burn out even when using fuels with a low content of volatile constituents, and a low degree of conversion into NOx of the nitrogen which is led to the calciner together with the fuel. It will thus be possible to generate a NOx-reducing zone by introducing calciner fuel into the NOx-laden kiln exhaust gases while simultaneously ensuring a high combustion temperature within the range 900 and 1500° C. even when the combustion process is based on fuels with a low content of volatile constituents. As a result, the resultant NOx-formation will be at a much lower level than is attainable for prior systems. The high combustion temperature is attained due to the fact that the raw meal, because of the downward-directed passage through the calciner, is routed down along the wall of the calciner, substantially under the action of gravity. This will reduce the cooling effect of the raw meal on the exhaust gas/fuel suspension during the combustion of the fuel. The high combustion temperature will also ensure, in addition to a low net formation of NOx, a rapid combustion of the fuel which is necessary for stable system operation. The raw meal which is directed down along the wall of the calciner will also protect the latter against the high temperatures which may occur, thus reducing, as a spin-off effect, the level of coatings on the wall.

The kiln exhaust gases may be introduced into the upper end of the calciner according to various suitable methods, such as radially, tangentially or axially.

The fuel may be introduced into the upper end of the calciner, either separately or together with the kiln exhaust gases. If the fuel is introduced separately this will preferably be done by injecting the fuel axially from the top of the calciner. Such axial injection may occur along the centreline of the calciner, but may also be radially displaced relative to the centreline. However, the fuel may also be injected radially, tangentially or in some other way from the side of the calciner. If the fuel is introduced together with the kiln exhaust gases it is preferred that the fuel is introduced into the kiln exhaust gases at such a location where effective contact can be ensured between the fuel and the NOx in the exhaust gases, thereby optimizing the NOx reduction process. Preferably, this can be done at an appropriate location before the kiln exhaust gases are introduced into the calciner.

The mixed suspension of kiln exhaust gases and fuel is preferably led down through the calciner, generating a flame in its central zone.

The preheated air from the clinker cooler and preheated raw meal from the preheater are preferably introduced into the calciner as a combined air/raw meal suspension. It is further preferred that this air/raw meal suspension is introduced tangentially so that the raw meal is slung out towards the calciner wall causing it to slide down along the wall, under the action of gravity, while the air forms an enveloping air cushion around the flame so that the air is gradually mixed with the exhaust gases/fuel suspension.

Alternatively, the preheated air from the clinker cooler and preheated raw meal from the preheater may be separately introduced into the calciner. In cases where this procedure is applied, the air may also be introduced axially, radially or in any other appropriate manner, while the raw meal may advantageously be introduced via one inlet opening or several inlet openings, arranged in a substantially uniform pattern around the circumference of the calciner.

For controlling the combustion temperature in the calciner, and thus to ensure a satisfactory degree of burn out of fuels which require a relatively long period of time at high temperatures, such as fuels having a low content of volatile constituents, it would be advantageous if the preheated raw meal is introduced into the calciner at several locations downstream along the unit. Thus, it is preferred that preheated raw meal may be introduced into the lower end of the calciner. Raw meal introduced into the lower end of the calciner will promptly undergo calcination, thus reducing the temperature to the level, which applies to the calcination process.

Preheated raw meal from the preheater may further be introduced into the calciner together with the kiln exhaust gases in order to bring about, due to its catalytic effect, a further reduction of the NOx level e.g. by promoting the reaction NO+CO to N 2+CO 2. Preheated raw meal which is introduced in this manner may advantageously be introduced into the kiln exhaust gas stream immediately after the discharge of these gases from the kiln. As a consequence hereof, the raw meal will lower the temperature of the kiln exhaust gases, thereby reducing any caking problems in the duct which carry the kiln exhaust gases from the kiln to the calciner. In this scenario, the exhaust gas/raw meal suspension may advantageously be introduced tangentially into the upper end of the calciner so as to to ensure that the raw meal is kept close to the wall of the calciner. As a result, the amount of raw meal in the central part of the reducing zone of the calciner will be quite small, and this means that a high temperature, and thus advantageous conditions for ignition and NOx-reduction, can be attained even when using fuels having a low content of volatile constituents.

The system for carrying out the method according to the invention is of the kind which can comprise a preheater, a calciner comprising an upper end and a lower end, a kiln and a subsequent clinker cooler, and being characterized in that it comprises means for introducing kiln exhaust gases into the upper end of the calciner, means for introducing fuel into the upper end of the calciner, means for introducing preheated air from the clinker cooler into the calciner at a location under the zone for introducing kiln exhaust gases and fuel, means for introducing preheated raw meal into the calciner at a location under the zone for introducing kiln exhaust gases and fuel, means for extracting exhaust gas/raw meal suspension from the lower end of the calciner and to convey it to a separating means and means for conveying the separated raw meal to the kiln.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS 1 system
11 calciner unit
11a upper portion calciner
11b lower portion calciner
12 NOx reduction zone
12a refractory layer
13 tertiary air inlet
18 reduction zone inlet cone
20 main calciner meal inlet
21 riser unit
30a first cooling calciner meal inlet
30b second cooling calciner meal inlet
40 constriction
50a, 50b fuel inlet

The invention claimed is:

1. A system for reducing $NO_x$ emission levels during the manufacture of cement clinker comprising a calciner unit further comprising:
    an upper portion;
    a lower portion;
    a $NO_x$ reduction zone in the lower portion having a refractory layer on the inside surface thereof;
    a tertiary air inlet in the upper portion for introducing tertiary air into the upper portion;
    a main calciner meal inlet located above the $NO_x$ reduction zone for introducing a main calciner meal portion into the upper portion;
    a first cooling calciner meal inlet located in the $NO_x$ reduction zone for introducing a first cooling calciner meal portion into a periphery of the $NO_x$ reduction zone for forming a peripheral layer of meal in the $NO_x$ reduction zone for protecting the refractory layer from hot kiln gas;
    a second cooling calciner meal inlet located in the $NO_x$ reduction zone;
    a fuel inlet located in or below the $NO_x$ reduction zone for introducing fuel into the $NO_x$ reduction zone for supporting a hot core of the hot kiln gas within the peripheral layer of the meal in the $NO_x$ reduction zone;
    wherein the first or second cooling calciner meal inlets located in the $NO_x$ reduction zone are arranged such that the cooling calciner meal portion is introduced tangentially into the $NO_x$ reduction zone; and
    a constriction located between the upper portion and lower portion for inhibiting the main calciner meal portion in the upper portion from entering the $NO_x$ reduction zone.

2. The system of claim 1, wherein the main calciner meal inlet is located above the tertiary air inlet.

3. The system of claim 1, further comprising a riser unit located below the $NO_x$ reduction zone wherein the fuel inlet is located below the $NO_x$ reduction zone in the riser unit.

4. The system of claim 3, wherein a cross-sectional area of the $NO_x$ reduction zone is larger than a cross-sectional area of the riser unit.

5. The system of claim 1, wherein the $NO_x$ reduction zone comprises a reduction zone inlet cone and wherein the fuel inlet is located immediately adjacent to and below the inlet cone.

6. The system of claim 1, wherein the second cooling calciner meal inlet is positioned laterally opposite the first cooling calciner meal inlet for introducing a second cooling calciner meal portion into the periphery of the $NO_x$ reduction zone forming a peripheral layer of the meal in the $NO_x$ reduction zone for further protecting the refractory layer from the hot kiln gas.

* * * * *